United States Patent [19]
Lim et al.

[11] 3,723,744
[45] Mar. 27, 1973

[54] OPTICAL TRACKER WITH VARIABLE DENSITY SPATIAL FILTER

[75] Inventors: Yen San Lim, Convent Station; Mahadevan Subramanian, Whippany, both of N.J.

[73] Assignee: Bell Telephone Laboratories, Incorporated, Murray Hill, N.J.

[22] Filed: Dec. 21, 1970

[21] Appl. No.: 99,818

[52] U.S. Cl. .............................. 250/203 R, 356/152
[51] Int. Cl. ......................... G01c 1/00, G01b 11/26
[58] Field of Search ............ 250/203 R, 203 CT, 226; 356/152

[56] References Cited

UNITED STATES PATENTS 2,958,783  11/1960  Taylor ........................... 250/203 R
3,413,478  11/1968  Gettelfinger et al. ............ 250/203 R

*Primary Examiner*—Ronald L. Wilbert
*Assistant Examiner*—V. P. McGraw
*Attorney*—R. J. Guenther and William L. Keefauver

[57] ABSTRACT

An optical filter whose transmission coefficient increases monotonically with distance from the center of the filter is placed in front of the Image Position Sensor of an optical tracker. The optical tracker is of the type using a single photocell and a single chopper for both azimuthal and elevational channels. The center of the filter lies substantially on the optical axis of the system. Accordingly, the beam returning from a target being tracked by the optical tracker is attenuated according to its displacement from the axis of the system. The effect of this variable attenuation is to reduce the cross-coupling between azimuthal and elevational channels and to linearize the dependence of the error signals upon the respective components of target image displacement.

7 Claims, 6 Drawing Figures

PATENTED MAR 27 1973

INVENTORS Y. S. LIM
M. SUBRAMANIAN
BY William Ryan
ATTORNEY

OPTICAL TRACKER WITH VARIABLE DENSITY SPATIAL FILTER

BACKGROUND OF THE INVENTION

This invention relates to optical tracking systems and, more particularly, to image position sensors used in such systems.

Optical trackers have advantages over microwave radar trackers when it is desired to track the course of objects moving at short range with high angular resolution. These advantages arise primarily from the narrow beam divergence of an optical source as compared to that of a microwave source. A laser source, although not necessary, is an ideal optical source for use in optical trackers.

An optical tracking system typically includes a telescope for intercepting radiant energy reflected from a target being tracked. The telescope focuses an image of the target upon an Image Position Sensor (IPS). This image is either centered with respect to the aperture of the IPS or displaced from the center of the aperture depending on whether or not the target is coaxial with the telescope axis. The IPS senses this displacement, which is typically linearly proportional to the angle at which the radiant energy from the target arrives with respect to the telescope axis. The IPS then typically produces first and second error signals that are proportional to the displacement of the image in the azimuthal and elevational directions, respectively.

The error signals produced by the IPS are used to drive azimuthal and elevational servomotors which orient the telescope so as to minimize the resulting error signals and, consequently, to cause the telescope to follow the motion of the target.

This invention is directed specifically to an improved IPS for use in such an optical tracker. Several types of IPS are known in the prior art. One class of such prior art IPS is characterized by the incorporation of a light chopper and a photomultiplier tube as its primary components. The light chopper in such an IPS may consist of a semicircular mirror that rotates about an axis that passes through the center of the diameter of the semicircular mirror. The axis is perpendicular to the mirror surface. The plane of the mirror is typically positioned at 45 degrees with respect to the focal plane of the telescope. The center of the circle is substantially coincident with the focal point of the telescope. The rotating mirror thus defines the aperture of the IPS. The rotating mirror typically reflects light incident from the telescope onto a photomultiplier tube.

If the image of the target is formed at the center of the rotating mirror, equal energy is intercepted by the rotating mirror at all times. Hence, the output of the rotating mirror at all times. Hence, the output of the photomultplier tube is an unmodulated d-c signal. If, however, the image is off-center, the reflected optical signal acquires an a-c component which can be phase demodulated to generate two error signals that are measures of the displacement of the image along the azimuthal and elevational axes at the focal plane of the telescope. The single output signal from the photomultiplier tube is passed through an AGC circuit to remove variations in the signal level due to intensity fluctuations in the light from the target. The photomultiplier output signal is then fed to two phase demodulators which yield the two error signals.

The phase demodulators obtain their phase reference signals for separating the azimuthal and elevational axis errors from a phase reference generator that develops an electrical signal corresponding to the position of the rotating mirror. In one embodiment, this phase reference generator may comprise a lamp and a reference photodiode positioned so that light from the lamp is reflected via a semicylindrical side wall of the rotating mirror to the reference photodiode. Thus for each rotation of the mirror, the reference photodiode generates a square wave electrical signal. The reference photodiode is mechanically positioned so that the photodiode signal represents the elevation axis reference signal. The azimuthal reference signal is obtained by phase-shifting the reference photodiode output by 90 degrees. Alternatively, the reference phase generator may comprise an electromechanical generator whose shaft is rotationally coupled to that of the rotating mirror. As still another alternative, the signal empowering the motor driving the rotating mirror may be used directly as a reference signal if the driving motor operates synchronously.

Systems operating generally in accordance with the above principles are described, for example, in U.S. Pat. No. 2,958,783, issued to Taylor on Nov. 1, 1960, and No. 2,513,367, issued to Scott on July 4, 1950.

It can be shown that, in prior art systems, for displacements of the imaged target spot from the center of the rotating mirror that are small compared to the radius of the spot, the azimuthal and elevational error signals are relatively independent of each other. However, for spot displacements large compared to the spot radius, strong coupling results between azimuthal and elevational axis errors. In addition it has been found that, for large spot displacements, each error signal is nonlinear with respect to its corresponding component of displacement. These two effects, cross-channel coupling and nonlinearity, are attributable to the geometry of the optical system of the IPS. They adversely affect the performance of the optical tracker, causing either large overshoots and consequent jitter or sluggishness in tracking, depending on, among other things, the gain of the servomotor system.

It is therefore an object of the present invention to improve the performance of an optical tracking system by greatly reducing the cross-channel coupling between azimuthal and elevational axis error signals, and to render these signals substantially independent of each other.

It is a further object of this invention to reduce substantially the nonlinearity of each of the azimuthal and elevational error signals with respect to its corresponding component of displacement.

It is still another object of the present invention to provide an optical tracking system which provides smooth tracking performance, without overshoots, jitter, or sluggishness, for a wide range of target velocities.

SUMMARY OF THE INVENTION

These and other objects are accomplished in one embodiment of the present invention by the insertion of a Variable Density Spatial Filter (VDSF) in front of the rotating mirror. The VDSF is an optical filter whose transmission coefficient is spatially varying, the transmission through the filter being an increasing function of the radial displacement from the center of the filter. The use of such a filter renders each of the azimuthal and elevational error signals essentially linear with respect to the corresponding displacement as well as essentially independent of the displacement in the orthogonal direction. The manner in which the VDSF operates to achieve these results will be made clear by reference to the accompanying drawing and to the following detailed description.

DETAILED DESCRIPTION

Figure 1:
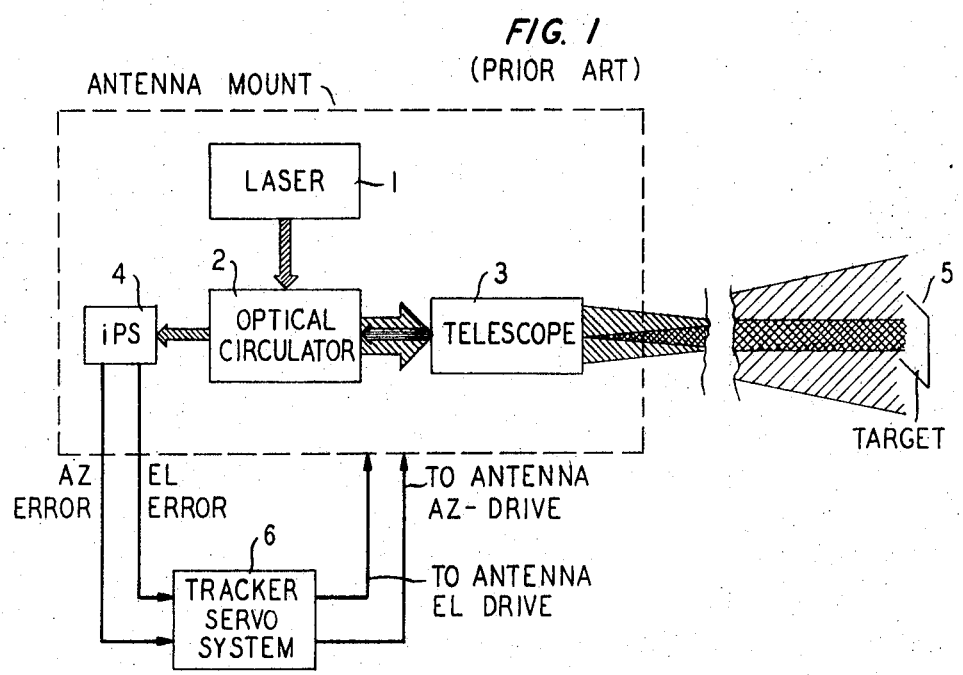
FIG. 1 is a schematic block diagram of a prior art optical tracking system.

FIG. 1 illustrates an optical tracking system in accordance with the prior art. Particular details of such a system are set forth, for example, in U.S. Pat. No. 2,513,367, issued to Scott on July 4, 1950, and No. 2,958,783, issued to Taylor Nov. 1, 1960. In the system of FIG. 1 a laser 1 is used to illuminate the object being tracked. An optical circulator 2 directs energy from the laser 1 to the telescope 3 and prevents energy from the laser 1 from passing directly to the IPS 4. The laser beam exiting the telescope 3 hits the target 5. A portion of the beam is intercepted and reflected by the target 5 and is collected by the telescope 3. The telescope 3 focuses the beam from the target 5 onto the aperture of the rotating mirror IPS 4, which aperture is located near the focal plane of the telescope 3.

The IPS 4 senses the position of the image of the target 5 and generates azimuthal and elevational error signals, depending upon the displacement of the target image from the center of the IPS aperture. These signals control a tracker servo system 6 which keeps the telescope 3 directed toward the target 5.

Figure 2:
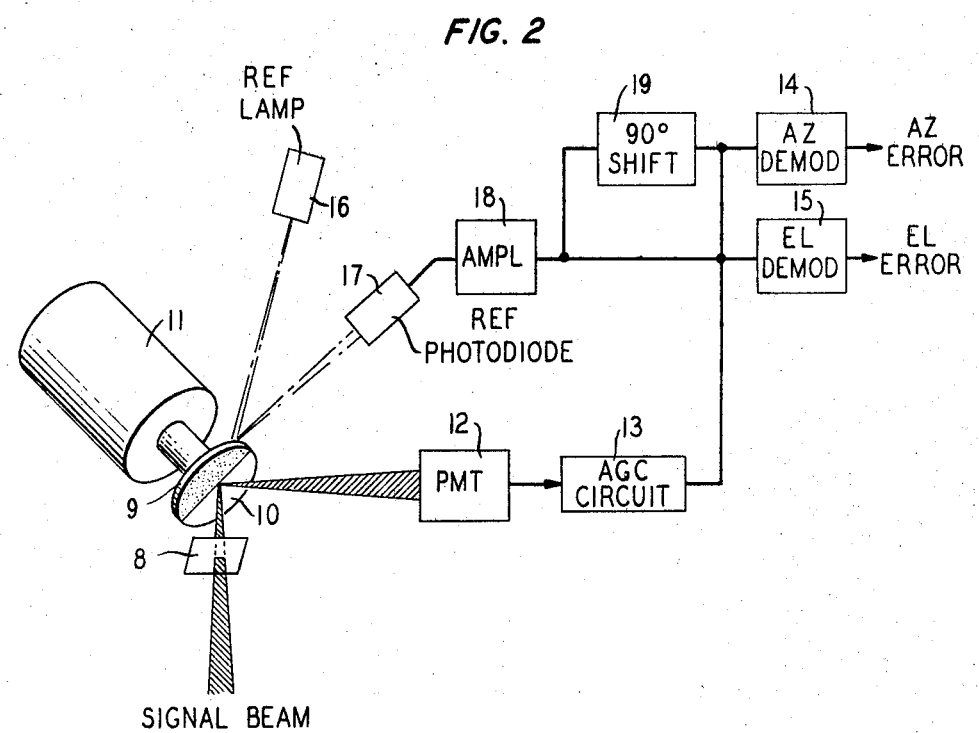
FIG. 2 is a diagram of a rotating mirror Image Position Sensor such as may be used in the tracking system of FIG. 1.

The construction of an IPS is diagrammed in FIG. 2. The IPS of FIG. 3 can be considered to be of the prior art type if the VDSF 8 is omitted. If the VDSF 8 is included, FIG. 2 shows an IPS in accordance with the present invention. Disregarding, for the present, the VDSF 8, the beam from the target 5 of FIG. 1 is focused at the center of the semicircular mirror 10 of FIG. 2. A motor 11 rotates semicircular mirror 10 about an axis passing through the center of the diameter of the semicircular mirror 10 and perpendicular to the mirror surface. A typical rate of rotation is 24,000 rpm.

The beam is reflected from the semicircular mirror 10 to a photomultiplier tube 12 which generates an electrical signal proportional to the instantaneous intensity of the incident beam. This signal is processed by an AGC circuit 13 which removes variations in signal amplitude due to intensity fluctuations in the beam returning from the target 5. Azimuthal phase demodulator 14 and elevational phase demodulator 15 demodulate the signal from the AGC circuit to obtain error signals indicative of the position of the focused target spot on the semicircular mirror 10. A phase reference signal for these demodulators is obtained from a reference photodiode 17. Reference photodiode 17 receives light from reference lamp 16 by way of periodic reflection from the semicylindrical sidewall 9 of semicircular mirror 10. The output of reference photodiode 17 is thus a square wave signal having a period equal to the time of rotation of semicircular mirror 10. This reference signal is amplified in amplifier 18. The amplified reference signal is used directly as a phase reference for elevational phase demodulator 15. A 90° phase shift is applied to the output of amplifier 18 by phase shift network 19. The phase shifted reference signal from phase shift network 19 becomes a phase reference signal for azimuthal phase demodulator 14. Phase reference signals may also be derived by other methods. For example, a two phase electromechanical generator used as a phase reference generator is disclosed in previously cited U.S. Pat. No. 2,513,367, issued to Scott. Alternatively, a photoelectric phase reference generator differing in some details from that used in the embodiment described above is disclosed in U.S. Pat. No. 3,413,478, issued to Gettelfinger et al on Nov. 26, 1968.

Figure 3:
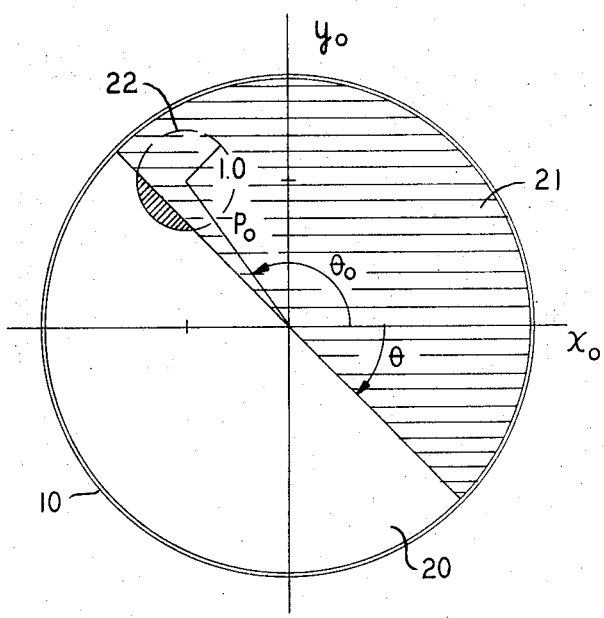
FIG. 3 is a diagram showing a target image spot on the face of a prior art rotating mirror chopper used in the Image Position Sensor of FIG. 2.

The relationship of the error signals generated by the phase demodulators 14 and 15 in FIG. 2 to the position of the target image spot in the IPS aperture can best be understood by reference to FIG. 3. FIG. 3 shows a semicircular mirror 10 which may constitute a circular disk diametrically divided into reflective half 20 and nonreflective half 21. The target image spot 22 is shown to be approximated by a circle of unit radius. The center of the circle has azimuth and elevation coordinates $x_o$ and $y_o$, which are normalized to the radius of the target image spot, and equivalent polar coordinates $\rho_o$ and $\theta_o$. The center of the diameter of the semicircular mirror defines the origin of the coordinate system, and the angular position of the semicircular mirror is given by the angle $\theta$. It is to be understood that the semicircular mirror rotates at a constant angular velocity so that the angle $\theta$ has a constant rate of change with respect to time. The coordinates $x_o$, $y_o$, $\rho_o$, and $\theta_o$, however, are independent of the angular position of the rotating mirror and are fixed according to the orientation of azimuth and elevation axes, as indicated above.

It can be shown, with reference to FIG. 3, that the fraction of the total light spot area which is reflected by the semicircular mirror for any instantaneous value of $\theta$ is given by $$f(\theta) = 1/\pi \, (\theta_1 - \tfrac{1}{2} \sin 2\theta_1)$$

where $$\theta_1 = 0 \text{ if } D > 1$$

$$\theta_1 = \cos^{-1} D, 0 < \theta_1 < \pi, \text{ if } |D| \leq 1$$

$$\theta_1 = \pi, \text{ if } D < -1,$$

and $$D(\theta) = \rho_0 \sin(\theta_0 - \theta).$$

Assuming that the Variable Density Spatial Filter 8 of the present invention is absent, the instantaneous electrical output of the photomultiplier tube 12 of FIG. 2 is directly proportional to this fractional reflected area $f(\theta)$. The effect of the elevational phase demodulator 15 upon this output can be characterized as multiplying $f(\theta)$ by $m(\theta)$, where $$m(\theta) = -1, -\pi/2 < \theta < \pi/2$$

$$= +1, \pi/2$$

$$= +1, \pi/2 < \theta < 3\pi/2,$$

and taking the average of this product. Hence, the error signal from the elevational phase demodulator, E, as a function of coordinates $x_o$ and $y_o$ is given by $$E(x_0; y_0) = -\frac{1}{\pi} \int_{-\frac{\pi}{2}}^{\frac{\pi}{2}} f(\theta) d\theta + \frac{1}{\pi} \int_{\frac{\pi}{2}}^{\frac{3\pi}{2}} f(\theta) d\theta \quad (1)$$

Similarly, the azimuthal phase demodulator 15 effectively multiplies $f(\theta)$ by $m(\theta + \pi/2)$ and averages the product, so that the error signal from the azimuthal phase demodulator as a function of the normalized coordinates $x_o$ and $y_o$ is given by $$A(x_0; y_0) = -\frac{1}{\pi} \int_{-\pi}^{0} f(\theta) d\theta + \frac{1}{\pi} \int_{0}^{\pi} f(\theta) d\theta$$

Figure 4:
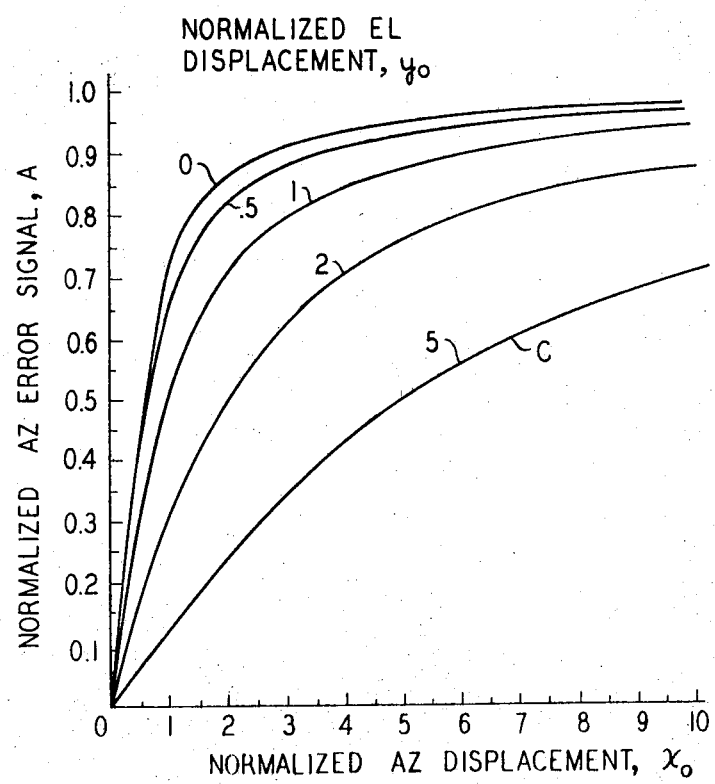
FIG. 4 is a graph of a prior art IPS error signal versus displacement for one axis, with displacement along the other axis as a parameter.

FIG. 4 presents a graph of normalized azimuthal error signal versus normalized azimuthal displacement, for a rotating mirror IPS of the type used in the prior art. The error signal is normalized to its maximum possible value. The normalized elevational displacement appears as a parameter distinguishing the various curves. By symmetry, the same graph can be interpreted as a plot of the normalized elevational error signal versus normalized elevational displacement with normalized azimuthal displacement as a parameter. For example, curve C in FIG. 4 can be considered to show either the normalized azimuthal error signal versus the normalized azimuthal displacement for a normalized elevational displacement of five units, or the normalized elevational error signal versus the normalized elevational displacement for a normalized azimuthal displacement of five units. Expressed mathematically, this symmetrical relation is $$A(x_0; y_0) = E(y_0; x_0).$$

The curves of FIG. 4 make apparent the limitations of prior art rotating mirror IPS's. It may be noted that the output is highly nonlinear. In particular, when $y_o = 0$, the output reaches 70 per cent of the maximum at $x_o = 1$, corresponding to an azimuthal displacement of only one radius of the light spot. This characteristic may serve as a severe limitation on the linear operating range and may result in bang-bang operation of the tracking system wherein the tracker servo system 6 of FIG. 1 provides maximum effort alternately in opposite directions. Bang-bang operation causes jitter and oscillation in tracking. When $y_o$ is large, the coupling between azimuth and elevation is very strong. This may lead to abrupt changes in the gain of the system, with consequent deleterious effects on tracking performance.

An ideal IPS would have a linear relationship between displacement along either axis and the corresponding error signal. Also, this linear relationship would be independent of the displacement along the orthogonal axis. Returning to FIG. 2 in accordance with one embodiment of the present invention, such ideal IPS behavior can be closely approximated by the interposition of a Variable Density Spatial Filter 8 (VDSF) near the plane of the semicircular mirror 10. The effect of the VDSF 8 is to render the light intensity on the semicircular mirror 10 nonuniform, so that the electrical output of the photomultiplier tube 12 is no longer dependent only upon the fractional reflected area $f(\theta)$, but is also dependent upon the position of the light spot in the plane of the semicircular mirror 10.

As noted above, equation 1 gives the error signal $E(x_o; y_o)$ from the elevational phase demodulator for an IPS of the type used in the prior art. Ideally, this error signal would be linear with $y_o$ and independent of $x_o$. The desired elevational error signal is thus $$D(y_o) = ky_o,$$

where $k$ is a constant. According to one embodiment of the present invention, a variable density spatial filter is interposed between the telescope 3 and the semicircular mirror 10 near the plane of the semicircular mirror 10, so that the output of the elevational phase demodulator 15 is no longer $E(x_o; y_o)$, but instead is a close approximation to $D(y_o)$. It can be seen that the ideal transmissivity of the VDSF necessary to realize the desired $D(y_o)$ exactly is given by $$[2E(l/2; l/2)y_o]_l/[l\, E(x_o; y_o)]$$

where $l$ is the edge dimension of the filter. To verify this fact, it may be noted that when this ideal transmissivity is multiplied by the unmodified elevational error signal $E(x_o; y_o)$, the product is the desired error signal $ky_o$, where $k$ is identified by $$k = [2E(l/2; l/2)]/l.$$

However, a VDSF with such a transmission coefficient, while providing the desired output for elevational channel, does not provide the desired output for the azimuthal channel. It can be seen by reasoning exactly analogous to that of the immediately preceding paragraph that, in order to provide the ideal azimuthal error signal from azimuthal phase demodulator 14, the transmissivity of the VDSF must be chosen as $$[2E(l/2; l/2)x_o]/[l\, E(y_o; x_o)].$$

These two transmissivity conditions cannot be fulfilled simultaneously, however. Thus in the preferred embodiment of the present invention, a compromise transmissivity is chosen. The compromise transmissivity is obtained by adding one-half of the transmissivity which would produce an ideal elevational output error signal to one-half of the transmissivity which would produce an ideal azimuthal output error signal. Thus the transmissivity of the VDSF in the preferred embodiment of the present invention is given by $$[E(l/2; l/2)y_o]/l\, E(x_o; y_o)] + [E(l/2; l/2)\, x_o]/[l\, E(y_o; x_o)].$$

Figure 5:
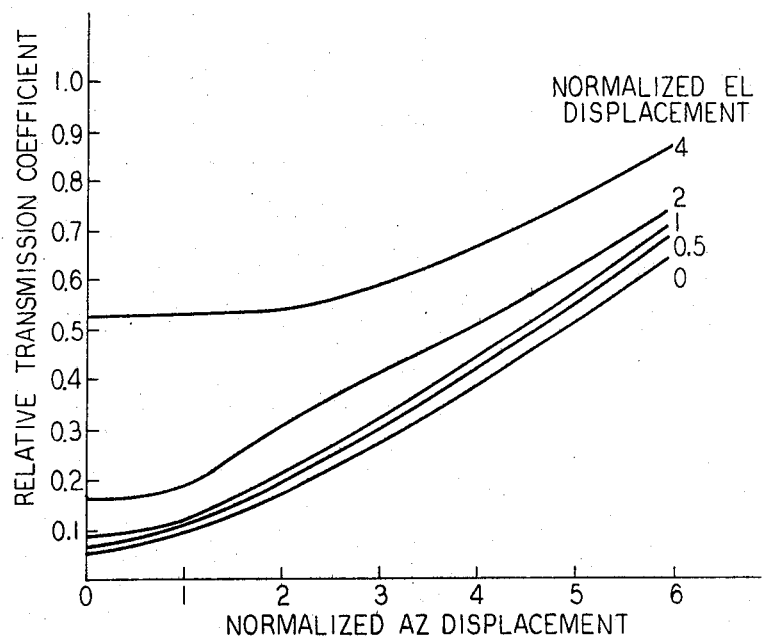
FIG. 5 is a graph of the transmission characteristics of a typical Variable Density Spatial Filter (VDSF) adapted for use in an IPS.
Figure 6:
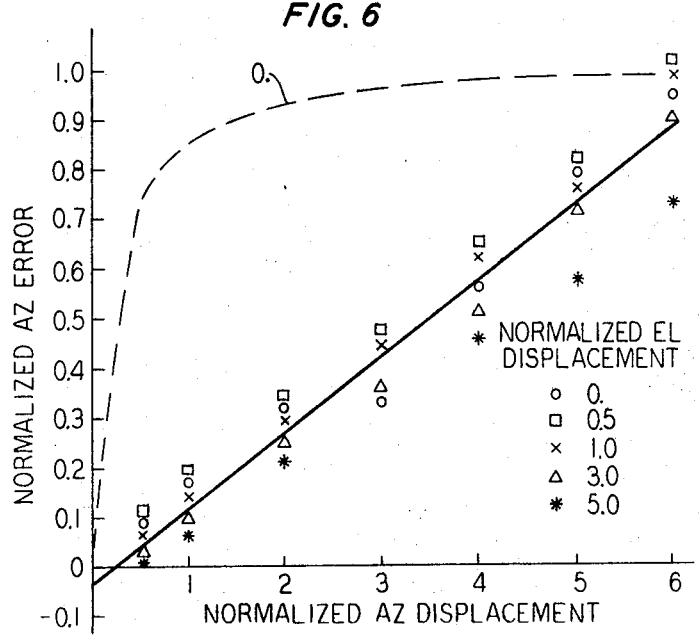
FIG. 6 is a graph of error signal versus displacement, for one axis, with displacement along the other axis as a parameter, drawn for an IPS with a VDSF.

FIG. 5 is a graph of the transmission characteristics of a VDSF as used in the preferred embodiment of the invention. FIG. 6 is a graph of error signal versus displacement determined experimentally for an IPS using a VDSF. A comparison of FIG. 4 and FIG. 6 illustrates clearly the advantages of the novel IPS of the present invention. It is readily apparent that both the non-linearity and cross-coupling of the prior art IPS of FIG. 4 are significantly reduced in the novel IPS with VDSF of FIG. 6. To facilitate comparison, the curve from FIG. 4 for zero elevational displacement is reproduced in FIG. 6 (dashed line).

The variable density spatial filter (VDSF) may be embodied in the form of a photographic transparency. In the preferred embodiment, the filter is a computer generated microfilm transparency. A digital computer may be used to calculate the transmissivity of the VDSF according to the present invention. A graphical output device such as the Stromberg Carlson 4060 microfilm printer may be used in conjunction with the digital computer and appropriate programs to produce the filter directly. The present invention is not restricted to computer generated filters, however, and any appropriate photographic or other method for producing transparencies of variable density may be used.

While the invention has been described in detail with respect to a particular rotating mirror type of IPS, it will be appreciated that the principles of this invention suggest to those skilled in the art methods for improving the response characteristics of other types of IPS as well. Moreover it will be appreciated by those skilled in the art that the principles of the present invention are applicable not only to linearization of IPS error signals, as described in the preferred embodiment, but also to tailoring IPS response to any other particular relation which may be desired. Therefore, the present invention is intended to be limited only by the scope and spirit of the appended claims.

What is claimed is:

1. In apparatus for receiving a light beam and providing output signals indicative of the displacement of said light beam along first and second coordinate axes which apparatus comprises
    light chopping means interposed in the path of said light beam for periodically interrupting the passage of said light beam according to its displacement,
    photodetector means positioned to intercept said light beam after said light beam has passed through said chopping means, said photodetector means providing an electrical signal proportional to the instantaneous intensity of said light beam, and
    demodulation means for receiving said electrical signal from said photodetector means and for providing first and second error signals indicative of the corresponding displacements of said light beam along said first and second coordinate axes,
    the improvement comprising a variable density spatial filter positioned in the path of said light beam for attenuating said light beam according to its displacement, so that said first and second error signals are substantially linearly proportional to the corresponding displacements.

2. The apparatus of claim 1 wherein said light chopping means comprises a disk diametrically divided into reflective and nonreflective areas and a motor rotating said disk about its axis.

3. The apparatus of claim 2 wherein said demodulation means comprises:
    means for generating first and second phase reference signals, the phase of said first phase reference signal having a fixed relationship to the angle of rotation of said disk and said second phase reference signal being 90° out of phase with said first phase reference signal, and
    first and second phase demodulators each receiving said electrical signal from said photodetector means, said first phase demodulator also receiving said first phase reference signal and said second phase demodulator also receiving said second phase reference signal, said first and second phase demodulators providing said first and second error signals, respectively.

4. In an image position sensor comprising optical means for focusing the image of a target toe tracked in a focal plane, a photodetector, and a rotary chopper positioned in said focal plane to periodically modulate the intensity of said image according to the position of said image in said focal plane, said chopper and said photodetector combining to produce an output signal indicating the position of said image in said focal plane, the improvement comprising:
    a variable density spatial filter positioned between said optical means and said focal plane for attenuating the intensity of said image according to its position in said focal plane, said filter having a transmission coefficient increasing monotonically with distance from its center so that the output of said photodetector includes components which vary in linear proportion to the displacement of said image from the center of said filter.

5. An image position sensor as recited in claim 4 further comprising demodulation means for receiving said output of said photodetector and extracting said components which vary in linear proportion to the displacement of said image from the center of said filter.

6. In apparatus for generating first and second signals which are substantially linearly proportional to the displacement of an object along corresponding first and second coordinate axes which apparatus comprises
    means for generating a light beam, the position of which is indicative of the position of said object,
    means for focusing said light beam onto an image plane, and
    first means responsive to the position of said light beam on said image plane, said first means providing output signals which are nonlinearly proportional to the displacement of said light beam in said image plane along said first and second coordinate axes,
    the improvement comprising an optical filter interposed between said means for focusing and said first means, said filter comprising a substantially planar optical medium whose transmissivity is a monotonically increasing function of the distance from the center of said optical medium.

7. The apparatus of claim 6 wherein said optical medium comprises a medium whose transmissivity varies as a function of spatial coordinates $x_0$ and $y_0$ in the plane of said optical medium, said $x_o$ and $y_o$ being rectangular coordinates with an origin at said center of said optical medium, so that the transmissivity is proportional to $$y_o/[E(x_o; y_o)] + x_o/[E(y_o; x_o)]$$

where $$E(x_0; y_0) = \frac{1}{\pi} \int_{-\pi/2}^{\pi/2} f(\theta) d\theta + \frac{1}{\pi} \int_{\pi/2}^{3\pi/2} f(\theta) d\theta$$

$$f(\theta) = 1/\pi \; (\theta_1 - \tfrac{1}{2} \sin 2\theta),$$

$$\theta_1 = 0 \text{ if } D > 1$$

$$\theta_1 = \cos^{-1} D, \; 0 < \theta_1 < \pi, \text{ if } |D| \leq 1$$

$$\theta_1 = \pi, \text{ if } D < -1,$$

$$D(\theta) = \rho_o \sin(\theta_o - \theta),$$

$$\rho_0 = \sqrt{x_o^2 + y_o^2},$$

and $$\theta_o = \tan^{-1}(y_o/x_o).$$

* * * * *